United States Patent [19]
Kunig et al.

[11] Patent Number: 5,385,244
[45] Date of Patent: Jan. 31, 1995

[54] SEPARATING MACHINE

[75] Inventors: Helmut Kunig, Bad Schwartau; Wolfgang Wagner, Reinfeld, both of Germany

[73] Assignee: Nordischer Maschinenbau Rud. Baader GmbH & Co KG, Lubeck, Germany

[21] Appl. No.: 236,135

[22] Filed: May 2, 1994

[30] Foreign Application Priority Data

May 4, 1993 [DE] Germany .............. 9306718

[51] Int. Cl.$^6$ .............................................. B07C 9/00
[52] U.S. Cl. ................... 209/699; 100/153; 100/90
[58] Field of Search ............ 209/699, 700, 45, 46; 100/90, 91, 211, 910, 169, 153

[56] References Cited

U.S. PATENT DOCUMENTS

| | | | |
|---|---|---|---|
| 3,006,465 | 10/1961 | James | 209/45 |
| 3,587,851 | 6/1971 | Anderson | 209/45 X |
| 3,599,788 | 8/1971 | Fyfe et al. | 209/46 X |
| 4,475,453 | 10/1984 | Davis | 100/90 X |
| 4,532,030 | 7/1985 | Avedian et al. | 209/700 X |
| 4,768,434 | 9/1988 | Beery | 100/169 X |
| 4,819,811 | 4/1989 | Ewing et al. | 209/699 |
| 4,932,855 | 6/1990 | Gersbeck et al. | 100/153 X |
| 5,103,720 | 4/1992 | Rose et al. | 100/153 X |
| 5,241,901 | 9/1993 | Kunig | 100/153 X |

*Primary Examiner*—D. Glenn Dayoan
*Attorney, Agent, or Firm*—Fay, Sharpe, Beall, Fagan, Minnich, & McKee

[57] ABSTRACT

The invention relates to a separating apparatus for separating a mixture of materials of different flowability for preparing foodstuffs. The apparatus includes a hollow drum having a perforated circumferential surface around a portion of which is wrapped an endless presser belt forming a compression zone for the material to be processed. The belt is pressed against the drum by a presser roller having a hub body around which a tubular cylindrical body forms the roller surface. The cylindrical body is supported in its middle portion by spherical supporting element mounted on the hub body. Thus when the belt is subjected to non-uniform stresses due to the uneven consistency of fed material which in turn causes the deformation and unparallel rotation of the drum and the presser roller, the cylindrical body automatically adjusts its position on said spherical supporting element to restore parallel motion.

21 Claims, 1 Drawing Sheet

SEPARATING MACHINE

BACKGROUND OF THE INVENTION

1. FIELD OF THE INVENTION

The invention concerns an apparatus for separating a mixture of materials of different flowability, in particular for preparing foodstuffs, comprising an endless presser belt and a rotationally driven hollow drum having a perforated circumferential surface, said endless presser belt being pressed against said hollow drum, to which end said presser belt is disposed to wrap around a portion of said circumference of said hollow drum and to form a compression zone and a draw-in wedge for the material to be separated, the pressing of said presser belt on said hollow drum being achieved by pressing means, which are adjustable with respect to the distance from the hollow drum for example in the form of a rotationally driven presser roller.

2. PRIOR ART

During operation of known apparatus of this type, very large forces occur in the compression gap between the hollow drum and the presser roller which result in the plastic deformation of the structure. This leads in particular to the shape of the compression gap becoming load-dependent and its sides unparallel, which results in the presser belt becoming unevenly worn due to differing stresses along its width dimension, and increased losses occurring due to leakage at the outer sides of the presser roller. Furthermore, such deformation has the effect that the predetermined pressure applied by the presser roller determined by the initial adjustment and setting of the roller is not uniformly distributed, i.e. the precise control of pressure is not possible. Such control is, however, a prerequisite for achieving a product of a specified quality.

3. OBJECTS OF THE INVENTION

The main object of the invention is thus to provide a separating machine in which the uniform pressure distribution in the compression gap is ensured.

A further object of the invention is to provide a machine in which the unparallel rotation of the presser roller is minimised.

A still further object of the invention is to provide a separating machine in which lateral leaks are kept to a minimum.

SUMMARY OF THE INVENTION

These and further objects of the invention are achieved in an apparatus for separating a mixture of materials of different flowability, in particular for preparing foodstuffs, comprising an endless presser belt and a rotationally driven hollow drum having a perforated circumferential surface, the endless presser belt being pressed against the hollow drum, to which end the presser belt is disposed to wrap around a portion of the circumference of said hollow drum and to form a compression zone and a draw-in wedge for the material to be separated; and pressing means for achieving the pressing of the presser belt against the hollow drum, the pressing means being rotationally driven, particularly in the form of a rotating presser roller, and adjustable with respect to the distance from the hollow drum, wherein the pressing means further comprise a hub body, a tubular cylindrical body connected with the hub body to be rotationally fixed to the same and forming a circumferential surface of the pressing means, and spherical supporting means, arranged between the hub body and a middle portion of the tubular cylindrical body, for supporting the middle portion of the tubular cylindrical body.

The advantages obtainable with this apparatus are that as well as alleviating the deficiencies associated with prior art machines, the uniform distribution of pressure results automatically, while parallel rotation of the presser roller is ensured and leaks of the material to be processed are practically eliminated.

A particularly robust and practically wear-free embodiment is achieved by effecting the connection between the hub body and tubular cylindrical body by means of at least one flexible annular element which is connected to the hub body and tubular cylindrical body by adhesion, the connection being preferably achieved in that the at least one annular element is made of a castable material, for example polyurethane, which is introduced between the hub body and the tubular cylindrical body during the casting process. The rotational connection can also be ensured by providing the interfaces between the flexible annular element and the hub body and the cylindrical body with toothing.

A particularly inexpensive embodiment is achieved when the spherical supporting element is formed as a spherical roller bearing or ball bearing.

BRIEF DESCRIPTION OF THE DRAWINGS

Other and further objects of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DETAILED DESCRIPTION OF THE PREFERRED EMBODIMENTS

Figure 1:
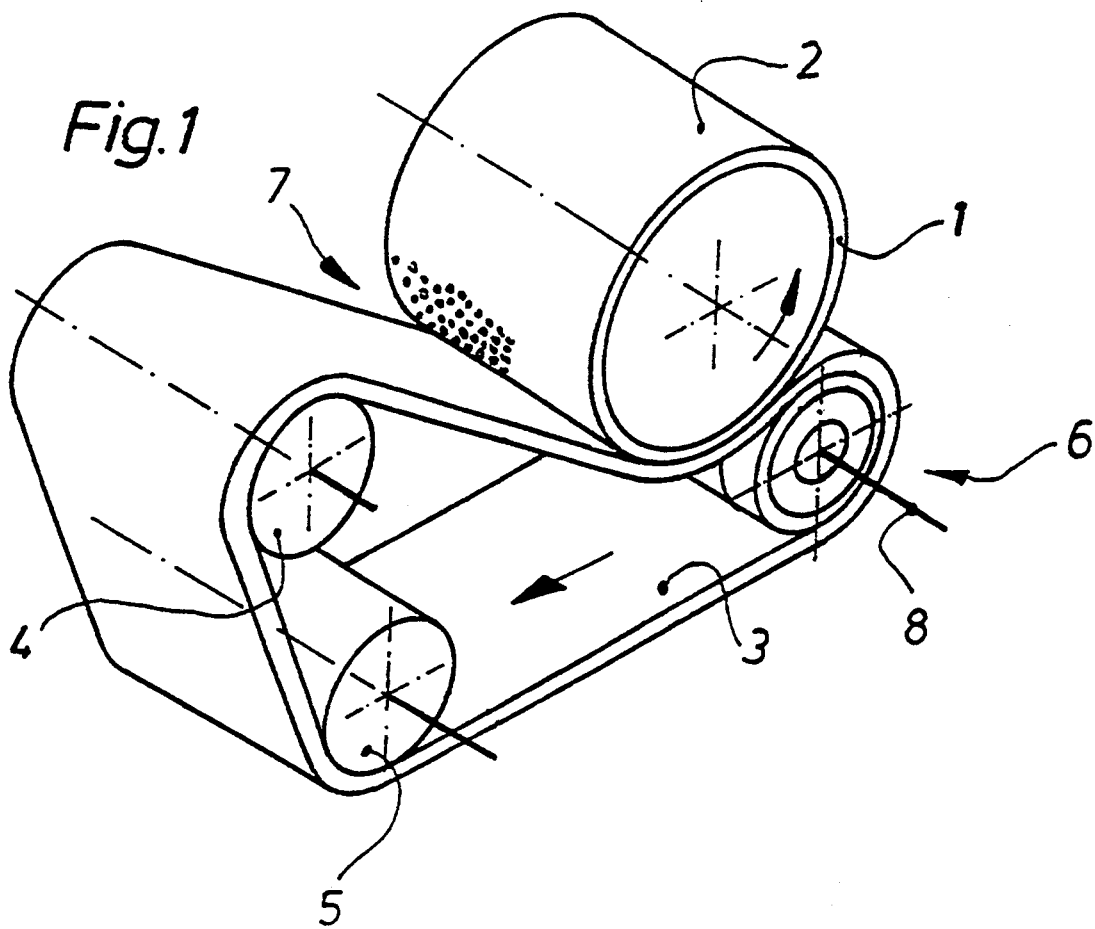
FIG. 1 shows a view of a separating machine shown in perspective.
Figure 2:
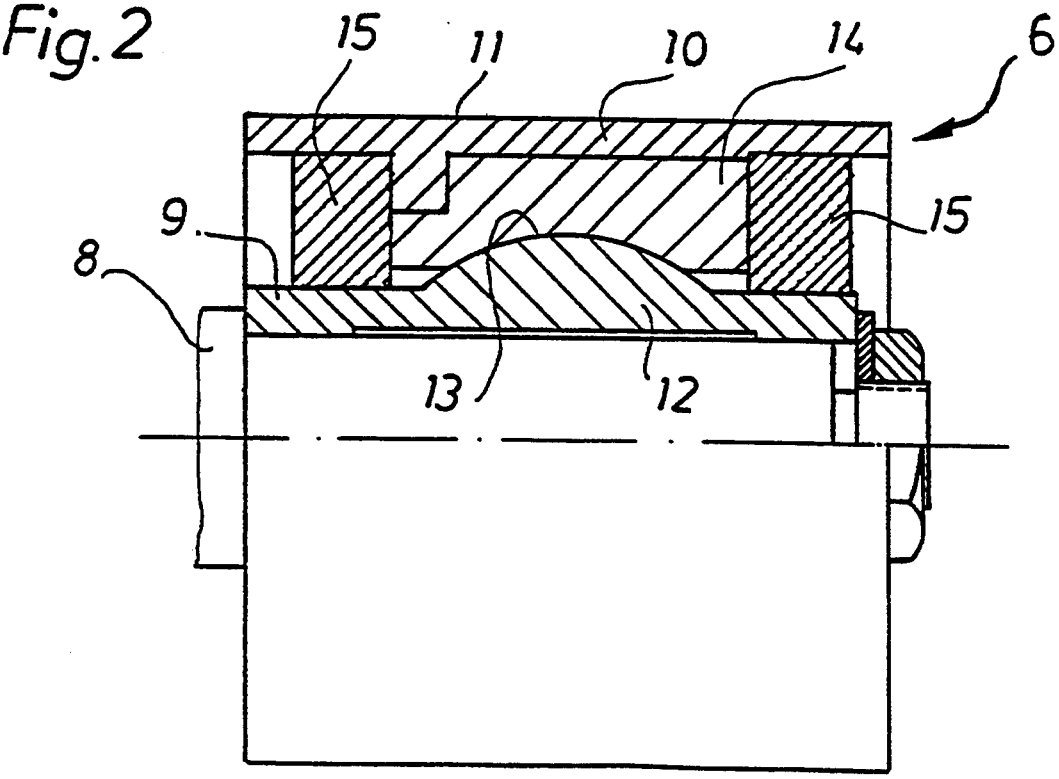
FIG. 2 shows a longitudinal cross-section of the presser roller of the machine according to FIG. 1.

In accordance with FIG. 1, the separating machine forming the basis of the invention comprises a hollow drum 1 having a perforated surface 2 and driven to rotate in a suitable manner. The drum 1 is in contact with an endless presser belt 3 wrapped around a portion of its circumference, which consists of a flexible or resilient material like rubber or polyurethane. The presser belt 3 is guided between parallel side walls which are not shown. The rotatory path of the presser belt is defined by at least three deflection rollers 4, 5, 6, of which the rollers 4 or 5 are formed as tension rollers with a corresponding possibility for adjustment which is not shown, while the roller 6 is designed as a presser roller. The roller 4 is arranged in such a way that a drawing wedge 7 is formed between presser belt 3 and hollow drum 1. The presser roller 6 is also adjustable with respect to its distance from the surface 2 of the hollow drum 1 by means of an adjustment mechanism which is also not shown. In accordance with FIG. 2, the presser roller 6 comprises a hub body 9 fixed to a driving shaft 8 and a hollow or tubular cylindrical body 10 which forms the surface 11 of the presser roller 6. The middle part of the hub body 9 is provided with a spherical supporting element 12 with a surface 13 on which a concave ring 14 of an essentially corresponding shape is supported, the concave ring being composed of two shell halves and having an outer surface which fits into the cylindrical body 10 and is axially fixed to the same. On each side of the spherical supporting element 12 there is provided a flexible annular element 15 which fills the annular gap between the hub body 9 and cylindrical body 10 and is connected to these bodies 9 and 10. The annular bodies 15 can be made from rubber or polyurethane and the connection with the hub body 9 and cylindrical body 10 can be achieved by vulcanization, adhesion or by positive locking, e.g. by some appropriate toothing.

The function of the above described separating machine is as follows.

The products to be separated, for example, a mixture of meat, tendons and possibly bones, supplied to the draw-in wedge 7, are pulled by frictional and/or gravitational forces onto the presser belt portion wrapped around the hollow drum 1 and subsequently into the compression gap between the presser roller 6 and the circumferential surface 2 of the hollow drum 1. Thus the products to be separated are subject to the deforming pressure of the presser belt 3 and caused to become imbedded in the flexible or resilient material of the presser belt 3 which results in the meat parts becoming scraped off or otherwise separated or extracted from the less flowable parts and flowing into the interior of the hollow drum 1 through its perforations.

The support forces occurring on the presser roller 6 during this process are transferred from the cylindrical body 10 via the spherical supporting element 12 to the driving shaft 8 of the presser roller 6 and lead to deformation which can disturb, among other things, the parallel motion of the driving shaft 8 of the presser roller 6 with respect to the axis of the hollow drum 1. If such a deformation occurs, the tubular cylindrical body 10 of the presser roller 6 swings or oscillates about the spherical supporting element 12 and will automatically become stabilised in a position in which the pressure distribution throughout the entire compression gap is uniform, i.e. in a position in which the surfaces 11, 2, respectively, of the hollow drum 1 and the cylindrical body 10 of the presser roller 6 again run parallel to one another.

We claim:

1. An apparatus for separating a mixture of materials of different flowability, in particular for preparing foodstuffs, comprising an endless presser belt and
   a rotationally driven hollow drum having a perforated circumferential surface, said endless presser belt being pressed against said hollow drum, to which end said presser belt is disposed to wrap around a portion of said circumference of said hollow drum and to form a compression zone and a draw-in wedge for the material to be separated; and
   pressing means for achieving the pressing of said presser belt against said hollow drum, said pressing means being rotationally driven and adjustable with respect to the distance from said hollow drum,
   said pressing means further comprising
   a hub body,
   a tubular cylindrical body connected with said hub body to be rotationally fixed to the same, said cylindrical body forming a circumferential surface of said pressing means, and
   spherical supporting means, arranged between said hub body and a middle portion of said tubular cylindrical body, for supporting said middle portion of said tubular cylindrical body.

2. An apparatus as claimed in claim 1, wherein said connection between said hub body and said tubular cylindrical body is formed by at least one flexible annular element, said annular element being connected to said hub body and tubular cylindrical body by adhesion.

3. An apparatus as claimed in claim 1, wherein said connection between said hub body and said tubular cylindrical body is formed by at least one flexible annular element and interfaces are formed between said annular element and said hub body and tubular cylindrical body, said interfaces comprising toothing.

4. An apparatus as claimed in claim 1, wherein said spherical supporting means is formed as a spherical roller bearing.

5. An apparatus as claimed in claim 1, wherein said spherical supporting means is formed as a ball bearing.

6. An apparatus as claimed in claim 2, wherein said spherical supporting means is formed as a spherical roller bearing.

7. An apparatus as claimed in claim 2, wherein said spherical supporting means is formed as a ball bearing.

8. An apparatus as claimed in claim 3, wherein said spherical supporting means is formed as a spherical roller bearing.

9. An apparatus as claimed in claim 3, wherein said spherical supporting means is formed as a ball bearing.

10. An apparatus as claimed in claim 2, wherein said at least one annular element is formed of a castable material, said castable material being introduced between said hub body and said tubular cylindrical body during casting.

11. An apparatus as claimed in claim 10, wherein said castable material is polyurethane.

12. An apparatus as claimed in claim 10, wherein said spherical supporting means is formed as a spherical roller bearing.

13. An apparatus as claimed in claim 10, wherein said spherical supporting means is formed as a ball bearing.

14. An apparatus as claimed in claim 3, wherein said at least one annular element consists of a castable material, said castable material being introduced between said hub body and said tubular cylindrical body during casting.

15. An apparatus as claimed in claim 14, wherein said castable material is polyurethane.

16. An apparatus as claimed in claim 14, wherein said spherical supporting means is formed as a spherical roller bearing.

17. An apparatus as claimed in claim 14, wherein said spherical supporting means is formed as a ball bearing.

18. An apparatus as claimed in claim 11, wherein said spherical supporting means is formed as a spherical roller bearing.

19. An apparatus as claimed in claim 11, wherein said spherical supporting means is formed as a ball roller bearing.

20. An apparatus as claimed in claim 15, wherein said spherical supporting means is formed as a spherical roller bearing.

21. An apparatus as claimed in claim 15, wherein said spherical supporting means is formed as a ball bearing.

* * * * *